Patented Sept. 26, 1944

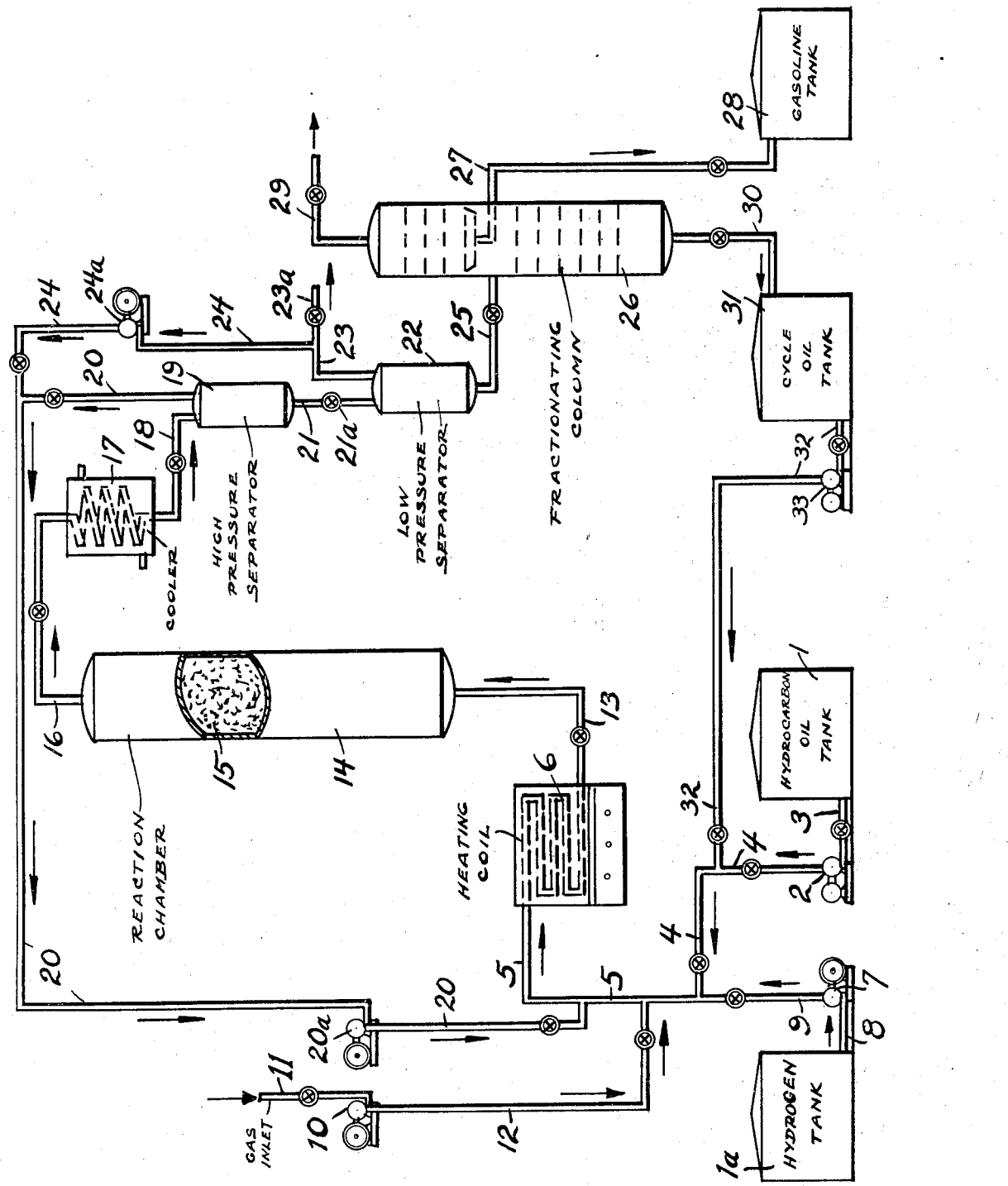

2,358,879

UNITED STATES PATENT OFFICE 2,358,879

DESTRUCTIVE HYDROGENATION

Aaron K. Redcay, Baton Rouge, La., assignor to Standard Catalytic Company, a corporation of Delaware Application January 1, 1942, Serial No. 425,259

3 Claims. (Cl. 196—53)

This invention relates to the destructive hydrogenation of hydrocarbon oils of the type of middle oils, gas oils and the like conducted in the presence of substantial quantities of methane and is more particularly concerned with the use of a new type of catalyst in such processes by means of which improved results are obtained.

The destructive hydrogenation of gas oils for the production of motor fuels of high octane number and other desirable characteristics is ordinarily carried out under pressures of the order of 200 atmospheres and in the presence of recycle gases containing 80% or more of free hydrogen. Recently it has been found that it is possible to conduct such destructive hydrogenation processes in the presence of substantial quantities of methane. The dilution of the hydrogen with methane has four important advantages over the use of substantially pure hydrogen, namely, (1) the amount of free hydrogen which must be produced and supplied to the process is greatly reduced; (2) an appreciable quantity of the methane is caused to react with the hydrocarbon oil and is thereby converted to a useful liquid product; (3) the octane number of the motor fuel produced is markedly higher than that of the product produced when operating in the absence of substantial quantities of methane and (4) the use of methane and its conversion to a useful liquid product provides an outlet for an otherwise refractory material which is commercially available in large quantities.

I have now found that catalysts consisting essentially of a metal of the iron group deposited upon a normally solid siliceous material which promotes cracking are especially effective for the destructive hydrogenation in the presence of substantial quantities of methane of hydrocarbon oils having a low sulfur content, say below about .05% by weight. The use of pressures as high as 800 or 1000 atmospheres is also beneficial.

The catalysts to be used according to the present invention comprise metallic nickel, cobalt or iron deposited upon highly active cracking catalysts such as "Super-Filtrol," aluminum silicate, synthetic impregnated or plural gels of silica and alumina, silica and magnesia, or silica and alumina and magnesia, or acid-treated clays of the bentonitic or montmorillonitic type. The quantity of metal in the catalyst may be between 1 and 15% by weight and is preferably between 4 and 10% by weight. The active carrier may or may not first be treated with fluorine, hydrofluoric acid, fluosilicic acid or other fluorine compounds.

These catalysts may be prepared by impregnating the active carrier with a solution of a soluble salt of the metal, preferably the nitrate, then extruding or otherwise shaping the plastic mass so obtained and drying the extruded mass in a steam oven at about 300–400° F. If the nitrate has been used for impregnation, some nitric acid as well as oxides of nitrogen will be evolved in this drying operation. Thereafter the dried mass is heated in a furnace to a temperature between 500 and 800° F. for a period of 10 to 12 hours or more in order to decompose the remaining nitrates. This results in a catalyst comprising the metal oxide deposited on the carrier. The metal oxide is then reduced to the metal by circulating hydrogen over the catalyst while the temperature is gradually raised to between about 600 and 900° F. This reduction treatment may take place in the reaction vessel in which the catalyst is to be used and immediately following complete reduction the destructive hydrogenation process may be begun by introducing the oil feed and the mixture of hydrogen and methane. In some cases it is found that the activity of the catalysts may be increased still further by treating the metallic catalyst prepared in the manner just described with sulfur containing gases, such as hydrogen sulfide, and then subsequently removing the sulfur by treatment with hydrogen or hydrogen and a sulfur-free oil.

The method of preparing these catalysts may be better understood from the following description of the preparation of a catalyst comprising about 7% metallic nickel on hydrofluoric acid-treated "Super-Filtrol":

About 100 pounds of an acid-treated "Super-Filtrol" as obtained from the manufacturer is charged to a suitable mixing device such as a Simpson mixer, and about 100 pounds of a 10% hydrofluoric acid solution is added thereto. The clay and solution are thoroughly mixed for a period of about an hour. A thin slurry is formed which is continuously charged to the top of a suitable drying furnace such as a Herreshoff furnace. The inlet temperature of the furnace is maintained at about 350° F. and the outlet temperature at about 600° F. The dried hydrofluoric acid-treated clay so obtained will still contain about 20% of volatile matter. It is then ground to a powder of about 200 mesh size.

About 100 pounds of the ground, dried hydrofluoric acid-treated clay so obtained is charged to another mixing device which may be similar to the first one and about 4 gallons of a solution containing about 31 pounds of nickel nitrate (Ni(NO₃)₂.6H₂O) is added thereto. This quantity of nickel nitrate is equivalent to about 9 pounds of nickel oxide or about 6.3 pounds of metallic nickel. The clay and solution of nickel nitrate are thoroughly mixed for about 30 minutes and ordinarily a semi-plastic mass suitable for immediate extrusion will be obtained. If necessary, water may be added in sufficient amounts to make the mass suitable for extrusion. Too much water should not be added because then a drying operation is required before extrusion.

The plastic mass is extruded in any suitable means for this purpose and the extruded mass is dried in a steam oven for about 8 or 9 hours at a temperature of about 325° F. The dried catalyst is then heated in a furnace to a temperature between 550 and 750° F. for a period of 12 hours to remove the last traces of nitrates.

The nickel oxide catalyst so obtained is placed in a suitable pressure vessel adapted to withstand pressures of 3000 pounds per square inch or more and hydrogen, free from sulfur and other impurities is circulated through it at a rate of about 1000 volumes of gas per volume of catalyst per hour. The temperature of the catalyst is raised at about 50° F. per hour to 325° F. and is maintained at this level for about 9 hours. The temperature is then raised further at about 30° F. per hour to 450° F. Thereafter, it is raised at 20° F. per hour to 550° F. and at 10° F. per hour to about 600° F. or more and maintained at this level for about 24 hours. The catalyst is then ready for use.

The same general method of preparing the catalyst is applicable when a synthetic impregnated gel of silica and alumina is used as the base instead of "Super Filtrol." The synthetic impregnated gel may be prepared in a number of different ways which are known in the art, one convenient method being as follows: equal portions of sodium silicate solution and acid are mixed in such concentrations as to form a clear, colloidal solution of silicic acid which upon standing sets into a firm hydrogel structure. The firm hydrogel after being permitted to set until syneresis is fully developed is broken into lumps and thoroughly washed until substantially free of reaction impurities. The silica hydrogel so obtained is impregnated with a solution of an aluminum compound which can be decomposed or converted into aluminum oxide, for example aluminum nitrate or aluminum acetate. The impregnated hydrogel is dried and then slowly heated to a temperature of about 700° F. or somewhat higher to convert the aluminum salt to the oxide and to convert the hydrogel into a dry gel. The resulting product is a synthetic impregnated gel of silica and alumina and may be used as the base material for preparing the catalysts used according to the present invention.

The manner in which the present process is carried out will be fully understood from the following description when read with reference to the accompanying drawing which is a semi-diagrammatic view in sectional elevation of one type of apparatus suitable for the purpose.

Referring to the drawing, numeral 1 designates a supply tank of a hydrocarbon oil to be converted to motor fuel. This hydrocarbon oil should preferably have a low sulfur content, say below about .05% by weight and consists essentially of hydrocarbons boiling in the range of kerosenes and gas oil. It may have been derived from any source, for example from the products of the distillation, destructive distillation, cracking, catalytic cracking, hydrogenation, destructive hydrogenation or other treatment of coals, tars, peats, mineral oils, petroleum, shales, lignite, brown coal, pitches, bitumens and other solid, semi-solid or liquid carbonaceous materials. Numeral 1a designates a supply tank of free hydrogen or a gas consisting essentially of free hydrogen. Pump 2 draws hydrocarbon oil from tank 1 through line 3 and forces it through lines 4 and 5 into a heating means 6. Compressor 7 draws hydrogen from tank 1a through line 8 and forces it through lines 9 and 5 also into heating means 6. Compressor 10 draws methane or a gas rich in methane, such as natural gas, for example, through line 11 from any convenient source and forces it through line 12 which meets line 9 carrying hydrogen. A mixture of hydrogen and methane is thereby formed at this point, and this mixture passes with the oil through the heating means 6. The heated mixture of oil, hydrogen and methane flows from heating means 6 through line 13 into a reaction chamber 14 containing a catalyst 15, the nature of which will be described below. Reaction chamber 14 is adapted to withstand high pressures and high temperatures and is resistant to attack by the reacting materials under the operating conditions.

Reaction chamber 14 is maintained under a pressure between 60 and 1000 atmospheres, preferably between 200 and 800 atmospheres and at a temperature between 500 and 1000° F., preferably between 550 and 850° F. The quantity of gas, consisting of a mixture of hydrogen and methane, which accompanies the oil through the reaction chamber may be between 5000 and 20,000 cubic feet per barrel of oil and the proportion of methane in said gas may be between 40 and 85 mol %. Minor amounts of carbon monoxide, carbon dioxide and water may also be present in the gas mixture. The rate at which the oil passes through the reaction chamber may be between 0.5 and 2.0 volumes of liquid oil per volume of catalyst per hour.

The catalyst 15 in reaction chamber 14 is one characterized by substantial hydrogenating activity. Examples of suitable types of catalyst for this purpose are sulfides of metals of the VI group of the periodic system preferably deposited upon a clay carrier. Sulfides of molybdenum, tungsten or chromium and metallic nickel, cobalt or iron deposited upon clay carriers of the type of natural or activated bentonites and montmorillonites, "Super Filtrol" and the like are especially effective. The carrier may be treated with fluorine compounds such as hydrofluoric acid and fluosilicic acid before the metal compound is deposited upon it. The quantity of metal compound deposited upon or associated with the carrier may be between 5 and 50% by weight.

Products of reaction leave reaction chamber 14 through line 16, pass through a cooling means 17 and then flow through line 18 into a high pressure separating means 19 wherein gaseous and liquid products may be separated. The gaseous products are removed from separating means 19 through line 20 and are recycled to line 12 by means of a booster compressor 20a. The liquid products are removed from separating means 19 through line 21, flow through a pressure reduction valve 21a and then discharge into a low pressure separating means 22 wherein the products caused to be vaporized by the reduction in pressure may be separated from the products which remain in liquid phase. The vaporized products, which will contain appreciable quantities of methane and other low molecular weight hydrocarbons, are removed from separating means 22 through line 23 and may be eliminated from the process through line 23a or a portion or all of them may be recycled by means of booster compressor 24a through line 24 to line 20 where they combine with the gaseous products leaving the high pressure separating means 19. It will be understood that the proper ratio of hydrogen to methane in the recycled gaseous products may be obtained by adjusting the quantities of fresh hydrogen and fresh methane supplied to the recycle gases through lines 8 and 11 respectively.

Liquid products are removed from low pressure separating means 22 through line 25 and introduced into a fractionating means 26. A fraction boiling in the range of gasoline or a motor fuel is withdrawn from the fractionating means through line 27 and collected in a tank 28. Hydrocarbons too volatile for inclusion in the motor fuel are removed from the top of the fractionating means through line 29 and may be discarded, passed to the refinery fuel line or otherwise disposed of. Fractions boiling above the range of the desired motor fuel are removed from the bottom of the fractionating means through line 30 and collected in a tank 31 from which they may be recycled to the fresh feed line 4 by means of line 32 and pump 33.

The following examples illustrate the application of the process and indicate the results obtained thereby:

The feed stock used in the experiments described in the examples is a cycle stock obtained as a bottoms in the destructive hydrogenation of a Quiriquire (Venezuelan) gas oil. This feed stock has the following characteristics:

Gravity_____°A. P. I__ 45
Initial boiling point_____°F__ 290
Final boiling point_____°F__ 470
Sulphur_____per cent by weight__ .001

Example 1

The feed stock just described is passed over a catalyst comprising metallic nickel supported on acid-treated clay at a feed rate of 1 volume of liquid per volume of catalyst per hour in a "once through" operation. A mixture of fresh and recycle gas consisting of hydrogen and methane is passed with the oil through the reaction chamber at a rate of 8000 cubic feet of gas per barrel of oil. The partial pressure of the hydrogen is 520 pounds per square inch and the partial pressure of the methane is 1920 pounds per square inch. The total pressure maintained in the reaction chamber is 3000 pounds per square inch and the temperature is maintained at an average of 739° F. Methane and hydrogen are separated from the normally liquid products and recycled. The product contained 13.2% by volume of an aviation gasoline having a Reid vapor pressure of 6.7 pounds and an A. S. T. M. octane number of 79.5. The octane number with 3 cc. of tetraethyl lead added is 93.3. In addition to the aviation gasoline, the product contained 85.1% by volume of gas oil bottoms, 2.7% by volume of excess pentane, 4.3% by volume of isobutane and 0.7% by volume of normal butane. All of these yields are based on the volume of feed used. In this experiment the net hydrogen consumption is 330 cubic feet per barrel of feed and the net methane consumption was 190 cubic feet per barrel of feed.

Example 2

The same feed and catalyst are used in this experiment as in that described in Example 1. However, the gas rate is increased to 11,000 cubic feet per barrel of feed and the total pressure is increased to 12,000 pounds per square inch. The partial pressure of hydrogen is 2400 pounds per square inch and the partial pressure of methane is 7600 pounds per square inch. The feed rate is 1 v./v./hour, the average temperature is 633° F. and the operation is "once through" with respect to the liquid feed but the hydrogen and methane are recycled. In this experiment the yield of aviation gasoline with a Reid vapor pressure of 7.1 pounds is 34.6% by volume. The gasoline has an A. S. T. M. octane number of 77.5 which is increased to 94.5 by the addition of 3 cc. of tetraethyl lead. In addition to aviation gasoline the product contains 60% by volume of gas oil bottoms, 2.6% by volume of excess pentane, 13.0% by volume of isobutane and 1.8% by volume of normal butane. The net hydrogen consumption is 724 cubic feet per barrel of feed and the net methane consumption is 290 cubic feet per barrel of feed.

Example 3

The feed stock and catalyst used in this experiment are the same as those used in the previous examples. The gas rate is 10,000 cubic feet per barrel of feed and the total pressure is 12,000 pounds per square inch. The partial pressure of hydrogen is 2500 pounds per square inch and the partial pressure of methane is 7500 pounds per square inch. The feed rate is 2 v./v./hr. The average catalyst temperature is 643° F. and the operation is "once through" with respect to the liquid feed, but the hydrogen and methane are recycled. The yield of aviation gasoline obtained in this case is 30.1% by volume. The gasoline has an A. S. T. M. octane number of 77.9 which is increased to 94.5 by the addition of 3 cc. of tetraethyl lead. The product also contains 64% by volume of gas oil bottoms, 3.4% by volume of excess pentane, 11.9% by volume of isobutane and 2.1% by volume of normal butane. The net hydrogen consumption is 491 cubic feet per barrel of feed and the net methane consumption is 133 cubic feet per barrel of feed.

It will be observed that in each of the above experiments an appreciable quantity of methane is consumed and is thereby converted to a useful liquid product.

While it is preferred to use the type of catalyst described with feed stocks of relatively low sulfur content it will be understood that they may also be used on feed stocks of higher sulfur content but in this latter case the activity of the catalyst will drop off much more rapidly. It is found that if the sulfur content of the feed is kept below about .05% by weight the catalyst will retain its activity for very long periods of time.

In some cases it is advantageous to add minor quantities of carbon monoxide, carbon dioxide or water to the mixture of hydrogen and methane.

It will be understood that numerous modifications may be made in the details of the operation without departing from the spirit and scope of the invention.

I claim:
1. An improved process for obtaining lower boiling hydrocarbons suitable for use as motor fuel from a higher boiling hydrocarbon oil of the type of gas oil which contains less than .05% by weight of sulfur, which comprises subjecting the higher boiling hydrocarbon oil to treatment with between 5000 and 20,000 cubic feet per barrel of oil of a mixture of hydrogen and methane in which the latter constitutes from 40 to 85 mol percent of the mixture, at a temperature between 500 and 1000° F., under a total pressure between 60 and 1000 atmospheres, and under such conditions that a substantial proportion of the methane reacts with the oil and in the presence of a catalyst comprising a minor proportion of a metal of the iron group deposited upon a normally solid siliceous material which promotes cracking, cooling the products of this treatment without substantial reduction of pressure, separating the liquid and gaseous products, substantially reducing pressure on the liquid products whereby a portion thereof is caused to vaporize, subjecting the products still remaining in liquid phase to fractionation to obtain a fraction boiling in the motor fuel range, and a fraction boiling above the motor fuel range, combining the vapors evolved by reduction of pressure with the gaseous products separated before the reduction of pressure, and recycling the mixture to the treatment to provide at least a portion of the mixture of hydrogen and methane required therein.

2. Process according to claim 1 in which the catalyst comprises from 1 to 15% by weight of nickel deposited upon "Super Filtrol."

3. An improved process for obtaining lower boiling hydrocarbon oils suitable for use as motor fuel from a higher boiling hydrocarbon boiling oil containing less than .05% by weight of sulfur which comprises subjecting the higher boiling hydrocarbon oil to the action of a mixture of hydrogen and methane in which the proportion of methane in the mixture is between 40 and 85 mol percent and in the presence of a catalyst comprising a minor amount of a metal of the iron group deposited upon a normally solid siliceous material which promotes cracking at a temperature between 500 and 1000° F., under a total pressure between 60 and 1000 atmospheres, and under such conditions that a substantial proportion of the methane reacts with the oil, and recovering from the products of this treatment a fraction boiling in the range of a motor fuel.

AARON K. REDCAY.